United States Patent
Lee et al.

(10) Patent No.: US 8,541,140 B2
(45) Date of Patent: Sep. 24, 2013

(54) FUEL CELL SYSTEM HAVING A VALVE CONTROLLING THE FLOW OF WATER TO A REFORMER BASED ON FUEL TANK PRESSURE

(75) Inventors: Sung-Chul Lee, Suwon-si (KR); Ju-Yong Kim, Suwon-si (KR); Sang-Min Jeong, Suwon-si (KR); Min-Jung Oh, Suwon-si (KR); Woong-Ho Cho, Suwon-si (KR); Jae-Woong Choi, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1138 days.

(21) Appl. No.: 11/892,676

(22) Filed: Aug. 24, 2007

(65) Prior Publication Data
US 2008/0096070 A1    Apr. 24, 2008

(30) Foreign Application Priority Data
Oct. 23, 2006 (KR) .................. 10-2006-0102905

(51) Int. Cl.
*H01M 8/06* (2006.01)
*H01M 8/04* (2006.01)

(52) U.S. Cl.
USPC ............ 429/414; 429/444; 429/515; 429/454

(58) Field of Classification Search
USPC .............. 429/414, 423, 425, 443, 444, 450, 429/454, 512, 513, 515
See application file for complete search history.

(56) References Cited

U.S. PATENT DOCUMENTS

| | | | |
|---|---|---|---|
| 6,350,536 B1 | 2/2002 | Ban | |
| 2003/0072982 A1* | 4/2003 | Takeuchi et al. | 429/19 |
| 2004/0062961 A1* | 4/2004 | Sato et al. | 429/19 |
| 2006/0006108 A1* | 1/2006 | Arias et al. | 210/232 |
| 2008/0107931 A1* | 5/2008 | Han et al. | 429/13 |

FOREIGN PATENT DOCUMENTS

| | | |
|---|---|---|
| EP | 1414093 | 4/2004 |
| EP | 1753063 A2 * | 2/2007 |
| JP | 62-117273 | 5/1987 |
| JP | 2000-149973 | 5/2000 |
| JP | 2002-260704 | 9/2002 |
| KR | 10-2002-0065118 | 8/2002 |
| KR | 10-2004-0087394 | 10/2004 |

OTHER PUBLICATIONS

*Search Report* from the European Patent Office issued in Applicant's corresponding European Patent Application No. 07118091.3 dated Jan. 25, 2008.

* cited by examiner

*Primary Examiner* — Edu E Enin-Okut
(74) *Attorney, Agent, or Firm* — Robert E. Bushnell, Esq.

(57) ABSTRACT

A fuel cell system includes a fuel cell stack, a reformer which generates a reformed gas through a reforming reaction between a gaseous fuel and water and supplies the reformed gas to the fuel cell stack, a fuel tank which compresses the gaseous fuel, stores the compressed fuel in an at least a partially liquid phase, and supplies the gaseous fuel to the reformer, a water tank connected to the fuel tank and the reformer to store water and to supply the water to the reformer by an internal air pressure of the fuel tank, and a first valve installed in a connection line connecting the water tank to the fuel tank to selectively open or close the connection line according to an electrical on/off pulse signal.

19 Claims, 7 Drawing Sheets

FUEL CELL SYSTEM HAVING A VALVE CONTROLLING THE FLOW OF WATER TO A REFORMER BASED ON FUEL TANK PRESSURE

CLAIM OF PRIORITY

This application makes reference to, incorporates the same herein, and claims all benefits accruing under 35 U.S.C. §119 from an application for FUEL CELL SYSTEM earlier filed in the Korean Intellectual Property Office on the 23$^{rd}$ day of Oct. 2006 and there duly assigned Serial No. 10-2006-0102905.

BACKGROUND OF THE INVENTION

1. Field of the Invention

The present invention relates to a fuel cell system, and more particularly, to a water supply structure of a fuel cell system.

2. Description of the Related Art

As is well known, a fuel cell is an electricity generating device using a fuel and an oxidant gas.

The fuel cell can be classified into a polymer electrolyte membrane fuel cell and a direct oxidation membrane fuel cell.

The fuel cell system using the polymer electrolyte membrane fuel cell includes a fuel cell main body, a reformer generating reformed gas by reforming a fuel and water and supplying the reformed gas to the fuel cell main body, a fuel tank supplying a fuel to the reformer, and a water tank supplying water to the reformer.

Recently, a fuel cell system using a gaseous fuel such as butane which can be easily purchased in the market was disclosed. In the fuel cell system, reformed gas is generated through a reforming reaction between the gaseous fuel and water in a reformer, and electrical energy is generated through an electrochemical reaction between the reformed gas and an oxidant gas in a fuel cell main body.

In the conventional fuel cell system, a pump used for supplying water to the reformer is included, thereby making miniaturization and weight reduction of the whole system difficult and generating noise. In addition, consumption of electrical energy occurs when the pump operates, thereby decreasing the performance efficiency of the whole system.

SUMMARY OF THE INVENTION

In order to solve the aforementioned problem, the present invention provides a fuel cell system capable of supplying water to a reformer by using a pressure of a gaseous fuel without a pump.

According to one aspect of the present invention, a fuel cell system is provided including: a fuel tank to store fuel; a water tank to store water, receive the fuel from the fuel tank, and to discharge the water by a pressure of the fuel; a pressure control unit connected to the fuel tank and the water tank to control the pressure of the fuel supplied to the water tank; and a driving unit connected to the fuel tank and the water tank.

The pressure control unit preferably includes a solenoid controlled valve installed in a connection line connecting the fuel tank to the water tank to selectively open or close the connection line according to an electrical on/off pulse signal.

The driving unit and the water tank are preferably connected to each other by a collection line to conduct water discharged from the driving unit into the water tank.

The fuel cell system preferably further includes a flow control unit installed in the collection line to control an amount of water conducted into the water tank from the driving unit.

The flow control unit preferably includes a check valve to selectively open or close the collection line according to a change in the pressure of the fuel supplied to the water tank.

The driving unit preferably includes a reformer to reform the fuel and the water and to generate a reformed gas.

The driving unit preferably includes a fuel cell stack to generate electrical energy using hydrogen and oxygen. The driving unit preferably includes: a reformer to reform the fuel and the water and to generate reformed gas; and a fuel cell stack to generate electrical energy through a reaction between the reformed gas and an oxidant gas.

The pressure control unit preferably includes a control unit to supply an electrical on/off pulse signal.

The fuel cell system preferably further includes an oxidant gas providing unit connected to the driving unit to supply an oxidant gas to the driving unit.

The fuel is preferably a gaseous fuel. The gaseous fuel is preferably stored in a compressed form in the fuel tank.

According to another aspect of the present invention, a fuel cell system is provided including: a fuel cell stack; a reformer to generate a reformed gas through a reforming reaction between a gaseous fuel and water and to supply the reformed gas to the fuel cell stack; a fuel tank to compress the gaseous fuel, store the compressed fuel in at least a partially liquid phase, and to supply the gaseous fuel to the reformer; a water tank connected to the fuel tank and the reformer to store water and to supply the water to the reformer by an internal air pressure of the fuel tank; and a first valve installed in a connection line connecting the water tank to the fuel tank to selectively open or close the connection line according to an electrical on/off pulse signal.

The first valve is preferably a solenoid controlled valve.

The water tank is preferably connected to the reformer through a collection line to collect the water discharged from the reformer.

The fuel system preferably further includes a second valve installed in the collection line to selectively open or close the collection line according to a change in the internal air pressure supplied to the water tank. The second valve is preferably a check valve.

The fuel cell stack and the water tank are preferably connected to each other through a collection line conducting the water discharged from the fuel cell stack into the water tank.

The fuel cell system preferably further includes a third valve installed in the collection line to selectively open or close the collection line according to a change in the internal air pressure supplied to the water tank. The third valve is preferably a check valve.

The fuel cell system preferably further includes a control unit to supply the pulse signal to the first valve.

The fuel cell system preferably further includes an oxidant gas providing unit connected to the fuel cell stack to supply an oxidant gas to the fuel cell stack.

The water tank preferably includes a water receiving unit to receive the water and a space unit to receive the gaseous fuel.

The gaseous fuel preferably contains at least one gas selected from a group consisting of methane, ethane, propane, and butane as a primary ingredient.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Exemplary embodiments of the present invention are described in detail hereinafter with reference to the accompanying drawings, so that this disclosure will fully convey the concept of the present invention to those skilled in the art. The present invention may, however, be embodied in many different forms and should not be construed as being limited to the embodiments set forth herein.

Figure 1:
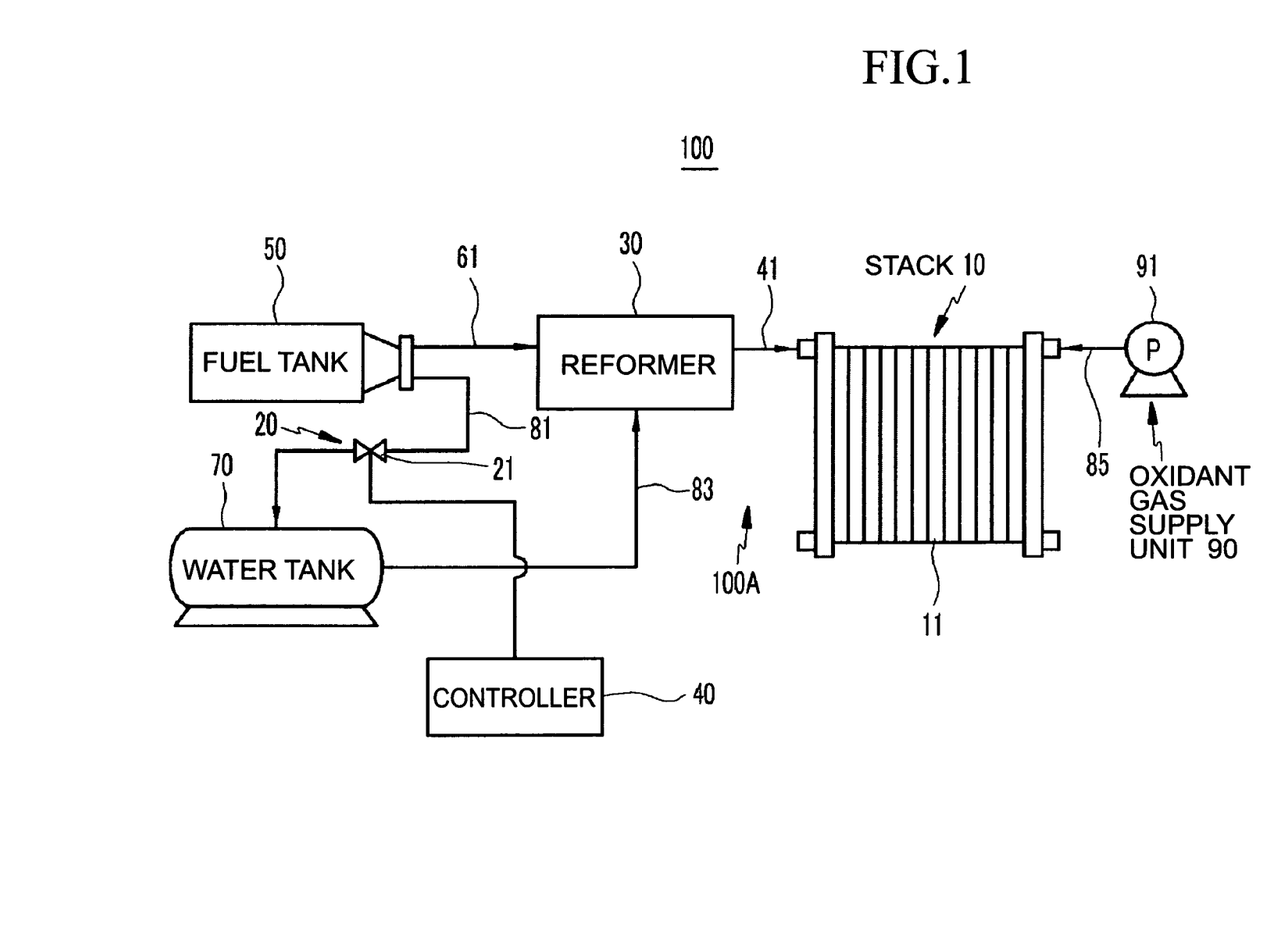
FIG. 1 is a schematic block diagram of a fuel cell system according to a first embodiment of the present invention.

FIG. 1 is a block diagram of a fuel cell system according to a first embodiment of the present invention.

Referring to FIG. 1, the fuel cell system 100 in the embodiment includes an energy generation system for generating electrical energy by using fuel and an oxidant gas and can be used as a portable power supply.

The fuel cell system 100 generates hydrogen-rich reformed gas by reforming the fuel and generates electrical energy through an oxidation reaction of the reformed gas and a reduction reaction of an oxidant gas. The fuel cell system is a polymer electrode membrane fuel cell.

The fuel may include a liquid fuel, such as methanol, ethanol, etc. However, hereinafter, a gaseous fuel, which is compressed and stored in a container in a liquid phase and maintains a gaseous phase at a room temperature, is used to explain the present invention. Hydrocarbon derivatives, such as natural gas, LPG, LNG, and butane may be used as the gaseous fuel.

The embodiments of the present invention are examples of portable fuel cell systems which can be used as portable power supplies, and so cases where butane is used as a gaseous fuel are explained. Butane is adequate for the fuel of a portable fuel cell, since butane is marketed in a liquid phase stored in a container, although butane is a gaseous phase at room temperature.

The fuel cell system 100 according to an embodiment of the present invention includes a fuel cell stack 10, a driving unit 100A including a reformer 30, a fuel tank 50, a water tank 70, and a oxidant gas supply unit 90.

The fuel cell stack 10 is connected to the reformer 30 and the oxidant gas supply unit 90. The fuel cell stack receives reformed gas from the reformer 30 and receives an oxidant gas from the oxidant gas supply unit 90. The fuel cell stack 10 includes an electricity generation unit 11 in units of a cell generating electrical energy through an electro-chemical reaction between the reformed gas and the oxidant gas. Accordingly, the fuel cell stack 10 in the embodiment includes a plurality of electricity generation units 11, and has a structure in which the electricity generation units 11 are disposed consecutively.

The reformer 30 is used for generating reformed gas containing hydrogen through a reforming reaction of the fuel such as a steam reforming reaction, a partial oxidation, and an auto-thermal reaction. The reformer 30 is also called as a fuel processor in the related industry.

In the embodiment, the reformer 30 has a structure in which the reformed gas is generated through the stream reforming reaction between the fuel and water. The reformer 30 is connected to the fuel cell stack 10 through a first connection line 41, such as a pipe. The reformer 30 supplies the reformed gas to the fuel cell stack 10 through the first connection line 41.

The fuel tank 50 stores the fuel in a liquid phase by being compressed to a predetermined pressure and is a closed container which can discharge the fuel using its internal pressure. The fuel tank 50 may be either attachable to or detachable from an exterior case (not shown) of the system. Accordingly, the fuel tank 50 is connected to the reformer 30 through a second connection line 61, such as a pipe, and is installed within the exterior case of the system. The fuel tank 50 supplies the fuel to the reformer 30 through the second connection line 61.

The water tank 70 is used for storing water and supplying the stored water to the reformer 30 and is a closed container having a storing space of a predetermined volume.

In this embodiment, the water tank 70 has a structure in which water is discharged by an internal pressure of the fuel tank 50, and the water is supplied to the reformer 30. For supplying the water to the reformer 30, the water tank 60 is connected to the fuel tank 50 through a third connection line 81 and connected to the reformer 30 through a fourth connection line 83. According to this embodiment of the present invention, the water tank 70 may have a structure in which the water can be charged to the storage space or a structure which is attachable to or detachable from the exterior case of the system, such as a cartridge.

Figure 2:
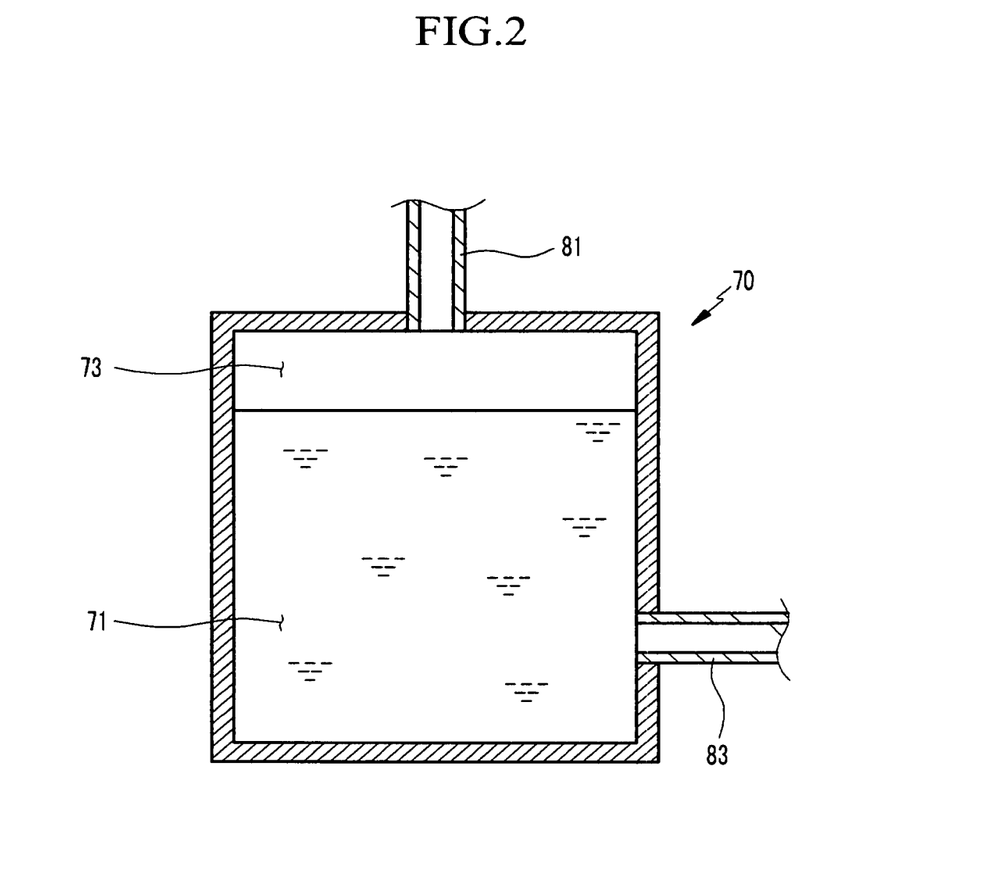
FIG. 2 is a schematic cross-sectional view of a water tank of FIG. 1.

The water tank 70, as illustrated in FIG. 2, includes a water receiving unit 71 for receiving the water and a space unit 73 for receiving the fuel. In this embodiment, the third connection line 81 is connected to the space unit 73, and the fourth connection line 83 is connected to the water receiving unit 71.

The oxidant gas supply unit 90 is used for supplying air as the oxidant gas to the fuel cell stack 10. The oxidant gas supply unit 90 includes an air pump 91 having a conventional structure in which air is input, and the air is sent to the fuel cell stack 10 with a pressure. The air pump 91 is connected to the fuel cell stack 10 through a fifth connection line 85, such as a pipe.

The fuel cell system 100 includes a pressure-control unit 20 according to an embodiment of the present invention. The pressure-control unit 20 controls the internal air pressure of the fuel tank 50 applied from the fuel tank 50 to the water tank 70, that is, the pressure of the fuel supplied to the water tank 50 from the fuel tank 50 through the third connection line 81.

In this embodiment, the pressure control unit 20 includes a first valve 21. The first valve 21 is installed in the third connection line 81. The first valve 21 includes a solenoid controlled valve selectively opening or closing a fuel flowing path of the third connection line 81 according to an electrical on/off pulse signal.

Figure 3:
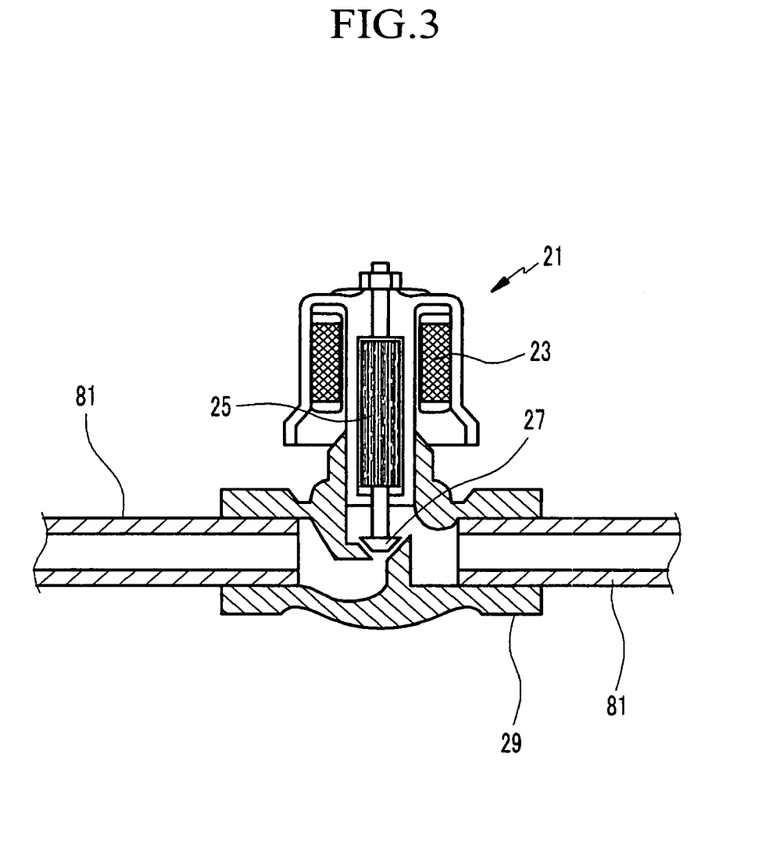
FIG. 3 is a schematic cross-sectional view of a first valve of FIG. 1.

In more detail, the first valve 21, as illustrated in FIG. 3, includes a magnetic field coil 23, a moving iron core 25, a valve body 27 which is connected to the moving iron core 25, and a flowing path 29.

When the on-pulse signal is supplied to the magnetic field coil 23 in the first valve 21, the moving iron core 25 is moved by the electromagnetic force generated by the magnetic field coil 23, and accordingly, the valve body 27 opens the flowing path 29. On the contrary, when the off-pulse signal is supplied to the magnetic field coil 23, the moving iron core 25 is moved back to an original position, and accordingly, the valve body 27 closes the flowing path 29. In this case, the third connection line 81 is connected to the flowing path 29 of the first valve 21.

In this embodiment, when the on-pulse is supplied to the first valve 21, the third connection line is open, and accordingly, the fuel which is compressed and stored in the fuel tank 50 is supplied to the water tank 70 through the third connection line. In other words, the internal air pressure of the fuel tank 50 is supplied to the water tank 70. Accordingly, the water stored in the water tank 70 is discharged outside by the pressure of the fuel.

On the contrary, when the off-pulse is supplied to the first valve 21, the third connection line is closed. In other words, the internal air pressure of the fuel tank 50 to be applied to the water tank 70 is blocked. Accordingly, the water stored in the water tank 70 is not discharged externally. The supplying of the on/off pulse signal to the first valve 21 can be controlled by a controller 40, such as a conventional controller.

In this embodiment, the amount of the water supplied from the water tank 70 to the reformer 30 can be controlled quantitatively by using the on/off pulse signal supplied to the first valve 21 by the controller 40.

Hereinafter, the operation of the fuel cell system 100 of this embodiment is explained in more detail as follows.

At first, the fuel which is compressed and stored in the fuel tank 50 is supplied to the reformer 30 through the second connection line 61. The fuel is discharged in a gaseous phase according to the internal air pressure of the fuel tank 50, since the fuel is compressed and stored in the fuel tank 50 in a liquid phase.

Simultaneously with the supply of the fuel, the controller 40 opens the third connection line 81 by supplying the on-pulse signal to the first valve 21. Then, the fuel stored in the fuel tank 50 is supplied to the fuel tank 70 through the third connection line 81.

In the process explained above, the water tank 70 is supplied with the internal air pressure from the fuel tank 50 and discharges water with the pressure of the fuel. Then, the water is supplied to the reformer 30 through the fourth connection line 83.

Accordingly, the reformer 30 generates reformed gas containing hydrogen through a steam reforming reaction between the fuel and the water and supplies the reformed gas to the fuel cell stack 10 through the first connection line 41.

Simultaneously with the supply of the reformed gas, the air pump inputs air and supplies the air to the fuel cell stack through the fifth connection line 85.

Accordingly, the fuel cell stack 10 outputs a predetermined amount of electrical energy through an electrochemical reaction in the electricity generation unit 11, that is, an oxidation reaction of the hydrogen contained in the reformed gas and a reduction reaction of the oxygen contained in the air.

Through the processes explained above, in this embodiment, the amount of the water supplied to the reformer 30 from the water tank 70 can be controlled quantitatively. The control of the supplied amount of the water can be performed by supplying the off-pulse signal to the first valve 21 using the controller 40 and thereby closing the third connection line 81. In other words, when the third connection line 81 is closed, the internal air pressure of the fuel tank 50 applied to the water tank 70 is blocked and the water stored in the water tank 70 is not discharged any more.

Figure 4:
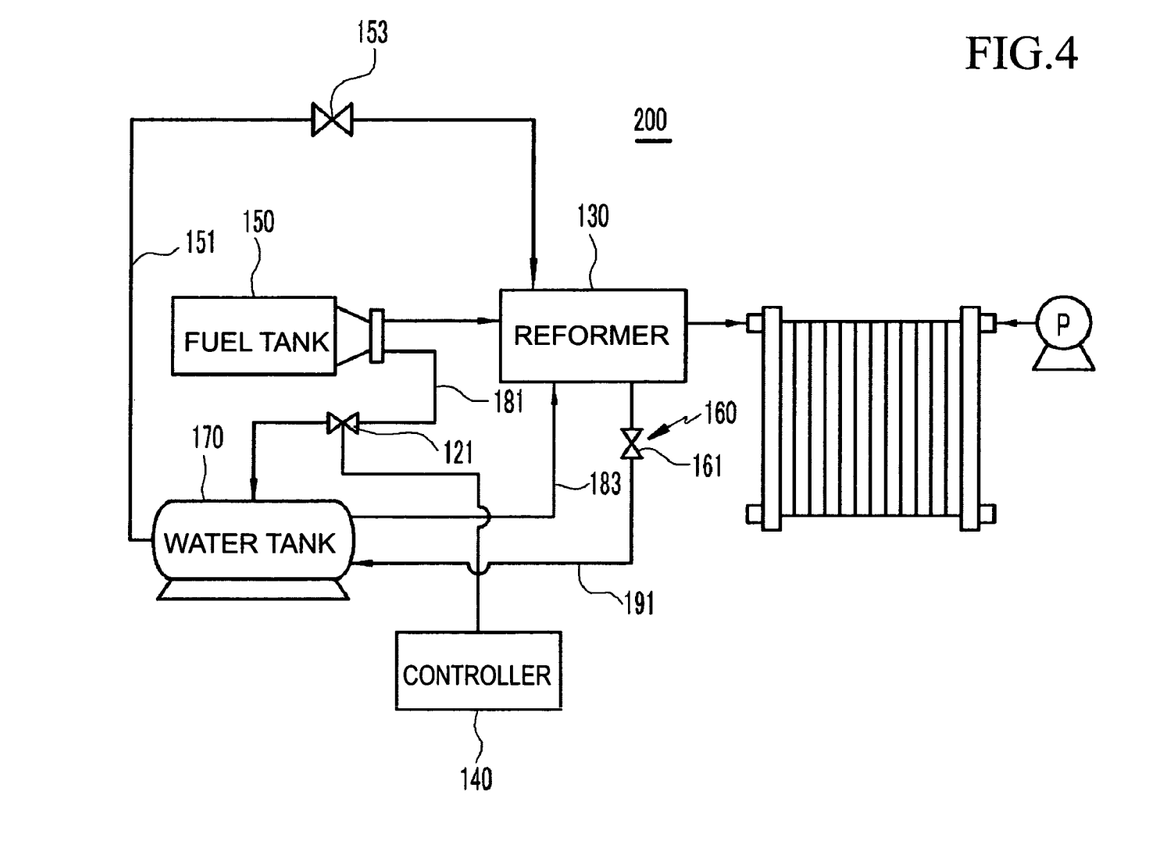
FIG. 4 is a schematic block diagram of a fuel cell system according to a second embodiment of the present invention.

FIG. 4 is a block diagram of a fuel cell system according to a second embodiment of the present invention.

Referring to FIG. 4, the fuel cell system 200 according to this embodiment has a structure in which the water discharged from the reformer 130 can be collected in the water tank 170 while having a same basic structure as that of the first embodiment.

In this embodiment, the reformer 130 has a structure in which water remaining after reaction with a fuel is discharged together with reformed gas in a process generating the reformed gas through a reaction between the fuel and the water. The reformer 130 is connected to a water tank 170 through a first collection line 191, such as a pipe. The water discharged from the reformer 130 is collected in the water tank 170 through the first collection line 191.

The fuel cell system 200 includes a flow control unit 160 according to this embodiment of the present invention. The flow control unit 160 controls the amount of water collected in the water tank 170 from the reformer 130.

According to this embodiment, the flow control unit 160 includes a second valve 161. The second valve 161 is installed in the first collection line 191. The second valve 161 includes a check valve selectively opening or closing a water flow path of the first collection line 191 according to an internal air pressure of the fuel tank 150 applied to the water tank 170, that is, a change in the pressure of the fuel.

When the pressure of the fuel is applied to the water tank 170, the second valve 161 closes the first collection line 191 according to the pressure of the fuel. On the other hand, when the pressure of the fuel is not applied to the water tank 170, the first collection line 191 is open according to the pressure of the water discharged from the reformer 130.

Figure 5:
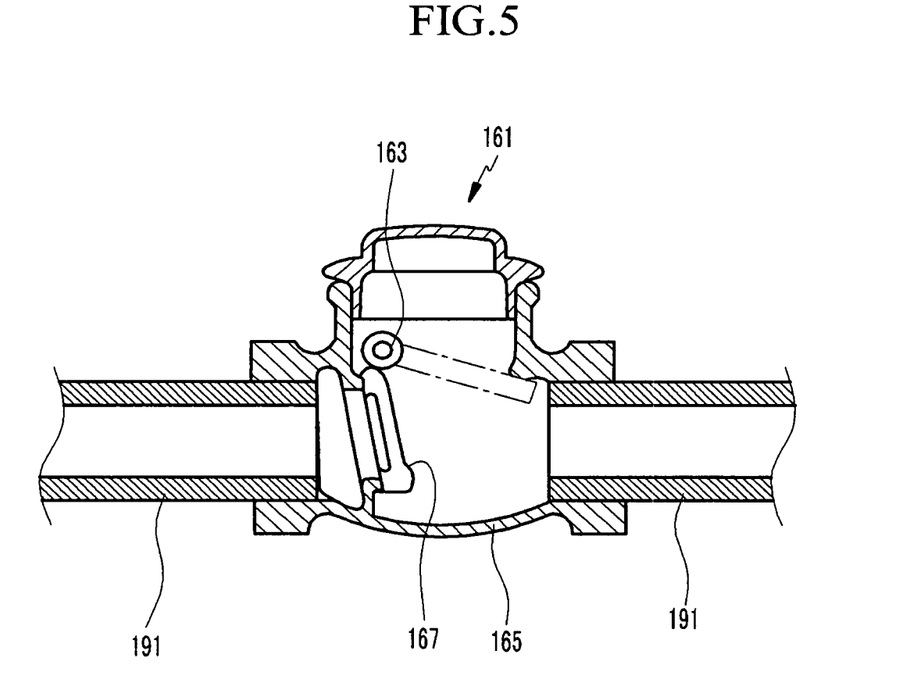
FIG. 5 is a schematic cross-sectional view of a second valve of FIG. 4.

The second valve 161 may include a conventional check valve having a lift type or swing type valve body. However, in the embodiment of FIG. 5, a check valve having a valve body 167 opens or closes a flow path 165 while rotating and moving with respect to a center hinge pin 163. In this case, the first collection line 191 is connected to the flow path 165 of the second valve 161.

In this embodiment of the fuel cell system 200, when an on-pulse signal is supplied to a first valve 121, as in the operation explained above in the first embodiment, a third connection line 181 is open. Then, the fuel stored in the fuel tank 150 is supplied to the water tank 170 through the third connection line 181.

The water tank 170 is supplied with the internal air pressure from the fuel tank 150, and the water is discharged according to the pressure of the fuel. Then, the water is supplied to the reformer 130 through a fourth line 183.

In the process explained above, the second valve 161 closes the first collection line 191 according to the pressure of the fuel, since the internal air pressure of the fuel tank 150 is applied to the water tank 170. Accordingly, the water discharged from the reformer 130 cannot flow into the water tank 170.

On the other hand, when an off-pulse signal is supplied to the first valve 121, as in the operation explained above in the first embodiment, the third connection line 181 is closed. Then, the internal air pressure of the fuel tank 150 applied to the water tank 170 is blocked, and accordingly the water stored in the water tank 170 is not discharged any more.

In the process explained above, the second valve 161 opens the first collection line 11191 according to the pressure of the water discharged from the reformer 130, since the internal air pressure of the fuel tank 150 is not applied to the water tank 170. Accordingly, the water discharged from the reformer 130 flows into the water tank 170 through the first collection line 191.

Accordingly, through a series of the processes explained above, the amount of the water collected in the water tank 170 from the reformer 130 can be controlled quantitatively in this embodiment.

The remaining structures and operations of the fuel cell system 200 in this embodiment are the same as those of the fuel cell system of the first embodiment explained above, and accordingly, a detailed description has been omitted.

Figure 6:
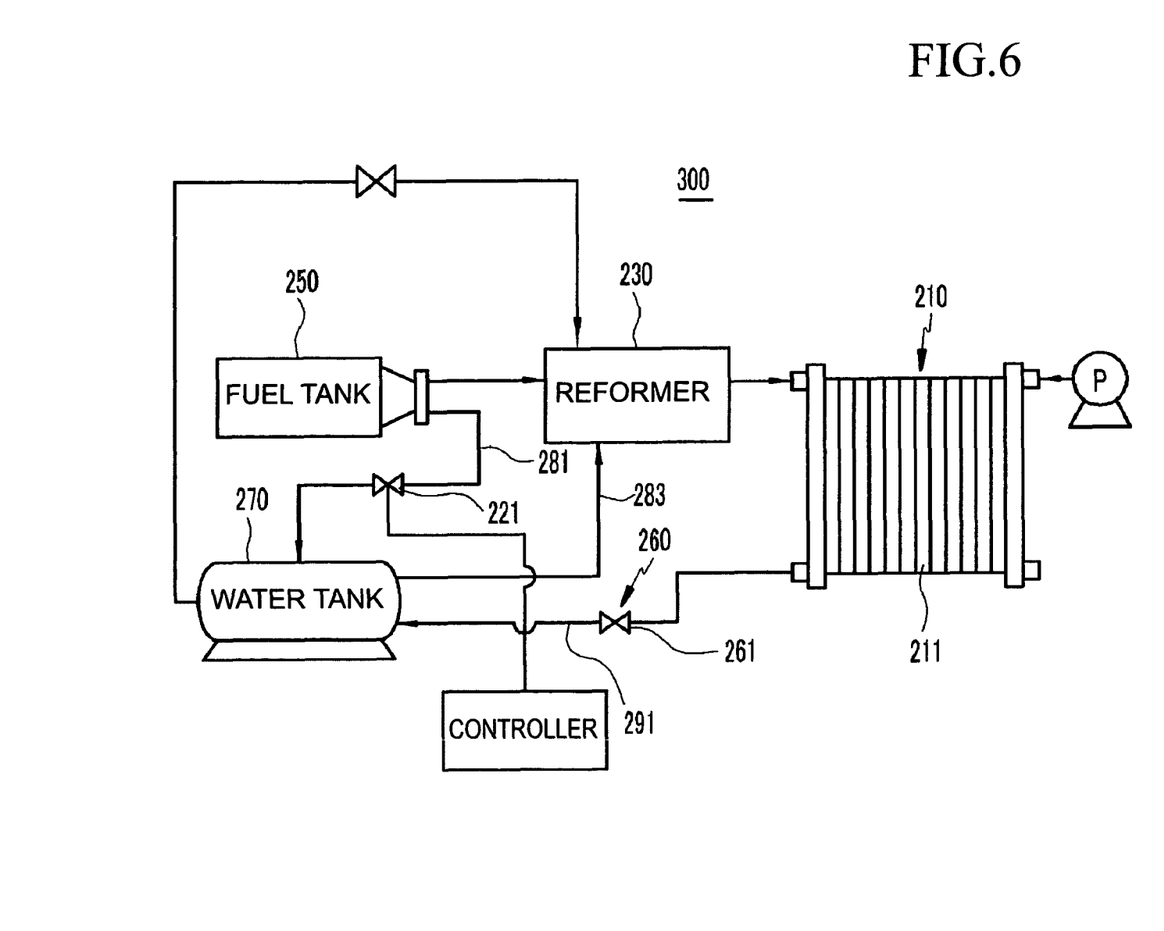
FIG. 6 is a schematic block diagram of a fuel cell system according to a third embodiment of the present invention.

FIG. 6 is a block diagram of a fuel cell system according to a third embodiment of the present invention.

Referring to FIG. 6, the fuel cell system 300 according to this embodiment has a structure in which the water discharged from a fuel cell stack 210 can be collected in a water tank 270 while having a same basic structure as that of the first embodiment.

In this embodiment, the fuel cell stack 210 has a structure in which water generated through a reduction reaction of oxygen is discharged in a process generating electrical energy through a reaction between reformed gas and an oxidant gas in an electricity generation unit 211. The fuel cell stack 210 is connected to a water tank 270 through a second collection line 291, such as a pipe. The water discharged from the fuel cell stack 210 flows into the water tank 270 through the second collection line 291

The fuel cell system 300 includes a flow control unit 260 used for controlling the amount of the water collected in the water tank 270 from the fuel cell stack 210.

According to the embodiment, the flow control unit 260 includes a third valve 261. The third valve 261 is installed in the second collection line 291. The third valve 261 includes a check valve selectively opening or closing a water flow path of the second collection line 291 according to internal air pressure of the fuel tank 250 applied to the water tank 270, that is, a change in the pressure of the fuel.

When the pressure of the fuel is applied to the water tank 270, the third valve 161 closes the second collection line 291 according to the pressure of the fuel. On the other hand, when the pressure of the fuel is not applied to the water tank 270, the second collection line 291 is open according to the pressure of the water discharged from the fuel cell stack 210. The third valve 261 includes the same check valve as that of the second embodiment explained above, and accordingly, a detailed explanation of the third check valve 261 has been omitted.

In this embodiment of the fuel cell system 300, when an on-pulse signal is supplied to a first valve 221, as in the operation explained above in the first embodiment, a third connection line 181 is open. Then, the fuel stored in the fuel tank 250 is supplied to the water tank 270 through the third connection line 281.

The water tank 270 is supplied with the internal air pressure from the fuel tank 250, and the water is discharged according to the pressure of the fuel. Then, the water is supplied to the reformer 230 through a fourth line 283.

In the process explained above, the third valve 261 closes the second collection line 291 according to the pressure of the fuel, since the internal air pressure of the fuel tank 250 is applied to the water tank 270. Accordingly, the water discharged from the fuel cell stack 210 cannot flow into the water tank 270.

On the other hand, when an off-pulse signal is supplied to the first valve 221, as in the operation explained above in the first embodiment, the third connection line 281 is closed. Then, the internal air pressure of the fuel tank 250 applied to the water tank 270 is blocked, and accordingly the water stored in the water tank 270 is not discharged any more.

In the process explained above, the third valve 261 opens the second collection line 291, since the internal air pressure is not applied to the water tank 270. Accordingly, the water discharged from the fuel cell stack 210 flows into the water tank 270 through the second collection line 291.

Accordingly, through a series of the processes explained above, the amount of the water collected into the water tank 270 from the fuel cell stack 210 can be controlled quantitatively in this embodiment.

The remaining structures and operations of the fuel cell system 300 in this embodiment are the same as those of the fuel cell system of the first embodiment explained above, and accordingly, a detailed description has been omitted.

Figure 7:
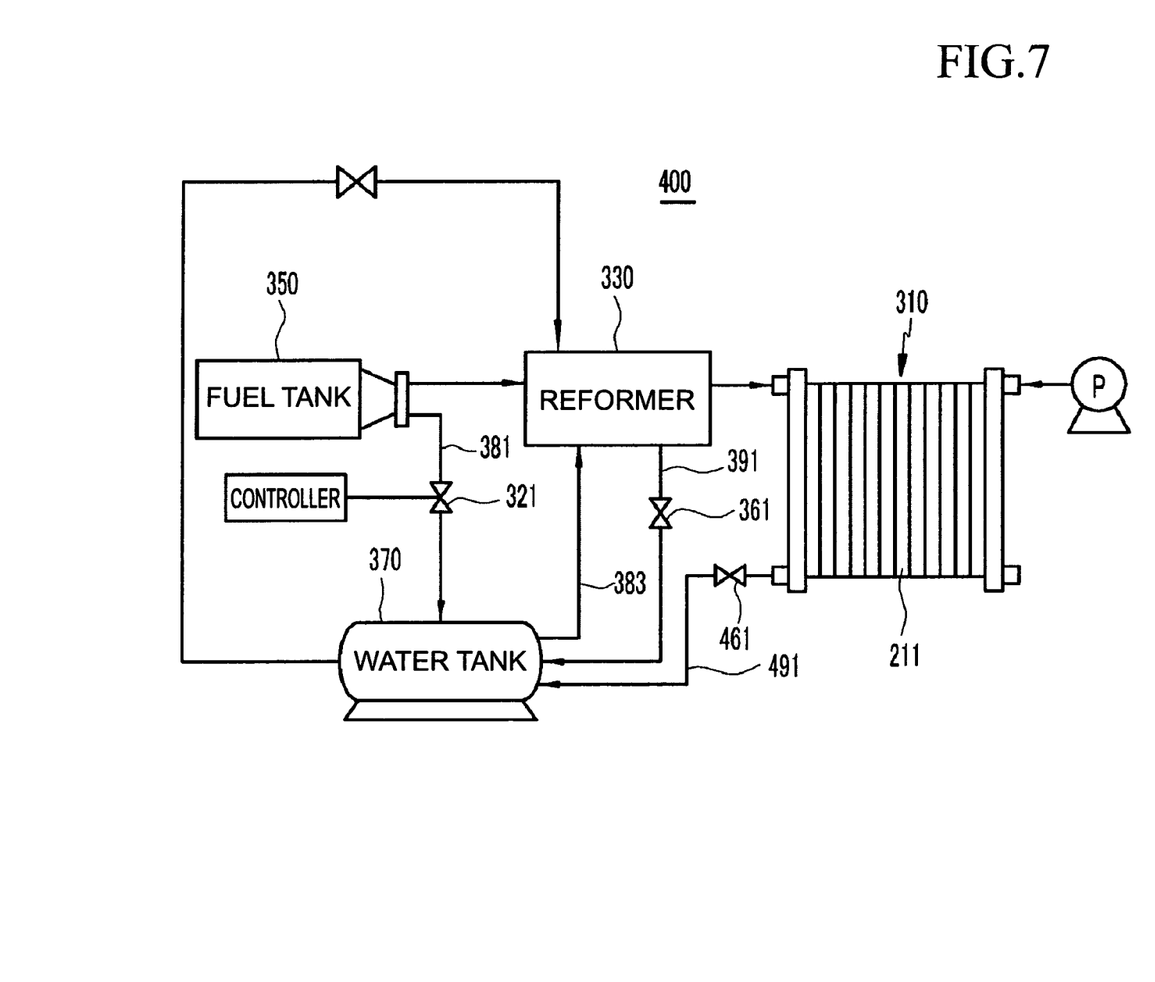
FIG. 7 is a schematic block diagram of a fuel cell system according to a fourth embodiment of the present invention.

FIG. 7 is a block diagram of a fuel cell system according to a fourth embodiment of the present invention.

Referring to FIG. 7, the fuel cell system 400 according to this embodiment has a structure in which the water discharged from a fuel cell stack 310 and a reformer 330 can be collected in a water tank 370 while having the same basic structure as that of the aforementioned embodiments.

The fuel cell system 400 includes first, second, and third valves 321, 361, and 461 as in the aforementioned embodiments. The first valve 321 is installed in a third connection line 381 which connects the fuel tank 350 to the water tank 370. The second valve 361 is installed in a first collection line 391 which connects the reformer 330 to the water tank 370. The third valve 461 is installed in a second collection line 491 which connects the fuel cell stack 310 to the water tank 370.

In this embodiment of the fuel cell system 400, when an on-pulse signal is supplied to the first valve 321, a third connection line 381 is open. Then, the fuel stored in the fuel tank 150 is supplied to the water tank 370 through the third connection line 381

The water tank 370 is supplied with the internal air pressure from the fuel tank 350, and the water is discharged according to the pressure of the fuel. Then, the water is supplied to the reformer 330 through a fourth line 383.

In the process explained above, the second and third valves 361 and 461 respectively close the first and second collection lines 391 and 491 according to the pressure of the fuel, since the internal air pressure of the fuel tank 350 is applied to the water tank 370. Accordingly, the water discharged from the fuel cell stack and reformer 310 and 330 cannot flow into the water tank 370.

On the other hand, when an off-pulse signal is supplied to the first valve 321, the third connection line 381 is closed. Then, the internal air pressure of the fuel tank 350 applied to the water tank 370 is blocked, and accordingly the water stored in the water tank 370 is not discharged any more.

In the process explained above, the second and third valves 361 and 461 open the first and second collection lines 391 and 491 according to the pressure of the water discharged respectively from the fuel cell stack 310 and the reformer 330, since the internal air pressure of the fuel tank 350 is not applied to the water tank 370. Accordingly, the water discharged from the fuel cell stack 310 and the reformer 330 respectively flow into the water tank 370 through the first and second collection lines 391 and 491.

Accordingly, through a series of the processes explained above, the amount of water collected in the water tank 370 from the fuel cell stack 310 and reformer 330 can be controlled quantitatively in this embodiment.

The remaining structures and operations of the fuel cell system 400 in this embodiment are the same as those of the fuel cell system in the aforementioned embodiments explained above, and accordingly, a detailed description has been omitted.

Although the aforementioned embodiments of the present invention adopt a polymer electrode membrane fuel cell system using a gaseous fuel, the present invention is not limited thereto. The present invention may be applied to a polymer electrode membrane fuel cell system using a liquid fuel or a direct oxidation membrane fuel cell system in which a reformer is not used.

The fuel cell system according to the embodiments of the present invention as explained above does not need a pump for supplying water to a reformer, thereby facilitating miniaturization and weight reduction of the system and decreased noise.

In addition, the consumption of electrical energy can be decreased by using an electronic valve, such as a solenoid controlled valve, instead of a conventional pump which consumes a relatively large amount of electrical energy.

Furthermore, according to the embodiments of the present invention, the manufacturing cost of the system can be decreased by using a solenoid controlled valve instead of a costly conventional pump.

Lastly, in the fuel cell system according to the embodiments of the present invention, the amount of water supplied to a reformer is quantitatively controlled and the water discharged from the reformer and/or a fuel cell stack is collected in a water tank, and the amount of the water collected in the water tank can be quantitatively controlled, thereby increasing an operation efficiency of the entire system.

While this invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A fuel cell system comprising:
   a fuel tank to store fuel;
   a water tank to store water, receive the fuel from the fuel tank, and to discharge the water by a pressure of the fuel;
   a pressure control unit connected to the fuel tank and the water tank to control the pressure of the fuel supplied to the water tank;
   a reformer connected to the fuel tank and the water tank to reform the fuel and the water and to generate reformed gas; and
   a fuel cell stack connected to said reformer to generate electrical energy through a reaction between the reformed gas and an oxidant gas; and
   a connection line having a valve directly connecting the reformer to the water tank, wherein in the absence or reduction of pressure from the fuel tank the valve opens conveying water from the reformer to the water tank.

2. The fuel cell system of claim 1, wherein the pressure control unit comprises a solenoid controlled valve installed in a connection line connecting the fuel tank to the water tank to selectively open or close the connection line according to an electrical on/off pulse signal.

3. The fuel cell system of claim 1, further comprising a flow control unit installed in a collection line to control an amount of water conducted into the water tank from the reformer.

4. The fuel cell system of claim 3, wherein the flow control unit comprises a check valve to selectively open or close the collection line according to a change in the pressure of the fuel supplied to the water tank.

5. The fuel cell system of claim 1, wherein the fuel cell stack generates electrical energy using hydrogen and oxygen.

6. The fuel cell system of claim 1, wherein the pressure control unit comprises a control unit to supply an electrical on/off pulse signal.

7. The fuel cell system of claim 1, further comprising an oxidant gas providing unit connected to a driving unit to supply an oxidant gas to the driving unit.

8. The fuel cell system of claim 1, wherein the fuel is a gaseous fuel.

9. The fuel cell system of claim 8, wherein the gaseous fuel is stored in a compressed form in the fuel tank.

10. A fuel cell system comprising:
    a fuel cell stack;
    a reformer to generate a reformed gas through a reforming reaction between a gaseous fuel and water and to supply the reformed gas to the fuel cell stack;
    a fuel tank to compress the gaseous fuel, store the compressed fuel in at least a partially liquid phase, and to supply the gaseous fuel to the reformer;
    a water tank connected to the fuel tank and the reformer to store water and to supply the water to the reformer by an internal air pressure of the fuel tank;
    a first valve installed in a connection line connecting the water tank to the fuel tank to selectively open or close the connection line according to an electrical on/off pulse signal, and
    a second valve installed in a connection line directly connecting the reformer to the water tank to selectively open or close the connection line and return water to the water tank in response to the absence or reduction in air pressure from the fuel tank.

11. The fuel cell system of claim 10, wherein the first valve is a solenoid controlled valve.

12. The fuel cell system of claim 10, wherein the second valve is a check valve.

13. The fuel cell system of claim 10, wherein the fuel cell stack and the water tank are connected to each other through a collection line conducting the water discharged from the fuel cell stack into the water tank.

14. The fuel cell system of claim 13, further comprising a third valve installed in the collection line to selectively open or close the collection line according to a change in the internal air pressure supplied to the water tank.

15. The fuel cell system of claim 14, wherein the third valve is a check valve.

16. The fuel cell system of claim 10, further comprising a control unit to supply the pulse signal to the first valve.

17. The fuel cell system of claim 10, further comprising an oxidant gas providing unit connected to the fuel cell stack to supply an oxidant gas to the fuel cell stack.

18. The fuel cell system of claim 10, wherein the water tank comprises a water receiving unit to receive the water and a space unit to receive the gaseous fuel.

19. The fuel cell system of claim 10, wherein the gaseous fuel contains at least one gas selected from a group consisting of methane, ethane, propane, and butane as a primary ingredient.

* * * * *